United States Patent [19]
Northrop et al.

[11] Patent Number: 6,026,610
[45] Date of Patent: Feb. 22, 2000

[54] LAWN EDGING WITH INTEGRAL STAKES

[75] Inventors: Melaney Northrop, Cleburne; Douglas J. Sharp, Arlington, both of Tex.

[73] Assignee: Doskcoil Manufacturing Company, Inc., Arlington, Tex.

[21] Appl. No.: 08/887,620

[22] Filed: Jul. 3, 1997

[51] Int. Cl.⁷ ....................................................... A01G 1/08
[52] U.S. Cl. ................................... 47/33; 52/102; 52/103
[58] Field of Search ................................. 47/2, 4, 25, 32, 47/33, 44, 45, 46, 47, 1.01 R; 52/102, 103, 169.1, 169.2, 169.3, 309.1; 404/8

[56] References Cited

U.S. PATENT DOCUMENTS 5,456,045  10/1995  Bradley et al. ............................. 47/33

*Primary Examiner*—Michael J. Carone
*Assistant Examiner*—Son T. Nguyen

[57] ABSTRACT

The present invention provides an edging strip with integrally molded stakes. The strip of the invention is a single, integrally molded piece, greatly simplifying construction, packaging, shipping, and assembly by the end user. Each strip will present an independent and usable item containing within the one piece the components necessary to position and attach the strip within the ground and to link it with other strips as desired. The integral stakes each also have broad top surfaces which provide a hammering surface for inserting the strip within the ground. The strip uses interlocking semi-stakes at its end points to connect with other strips, providing a full hammering surface when interlocked and providing anchoring points at the points of connection. The disclosed invention may also include support ribs with catches or ledges which act to resist the effects of frost heave and reduce unintentional removal of the strip from the ground. The support ribs do not extend to the top of the strip, leaving a blank panel section which may be used during the molding process to form various possible decorative sections to improve the visual appeal of the strip. The strip provides a barrier from relatively deep within the ground all the way up to the top surface for restricting the incursion of grass or weeds into the protected area.

27 Claims, 4 Drawing Sheets

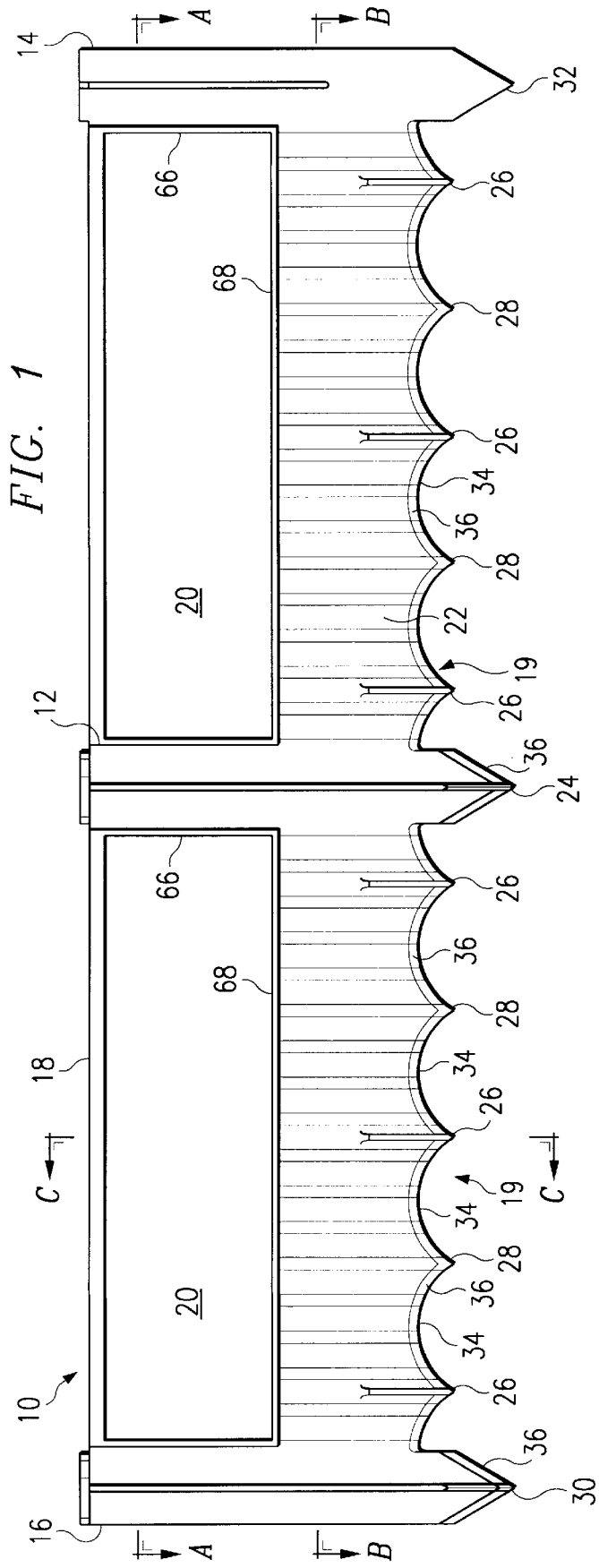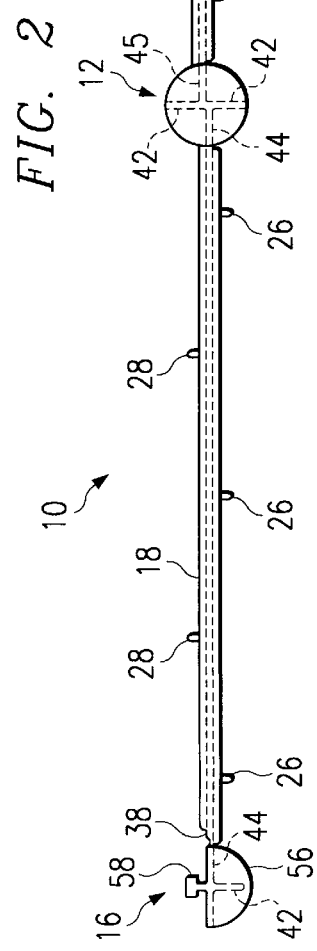

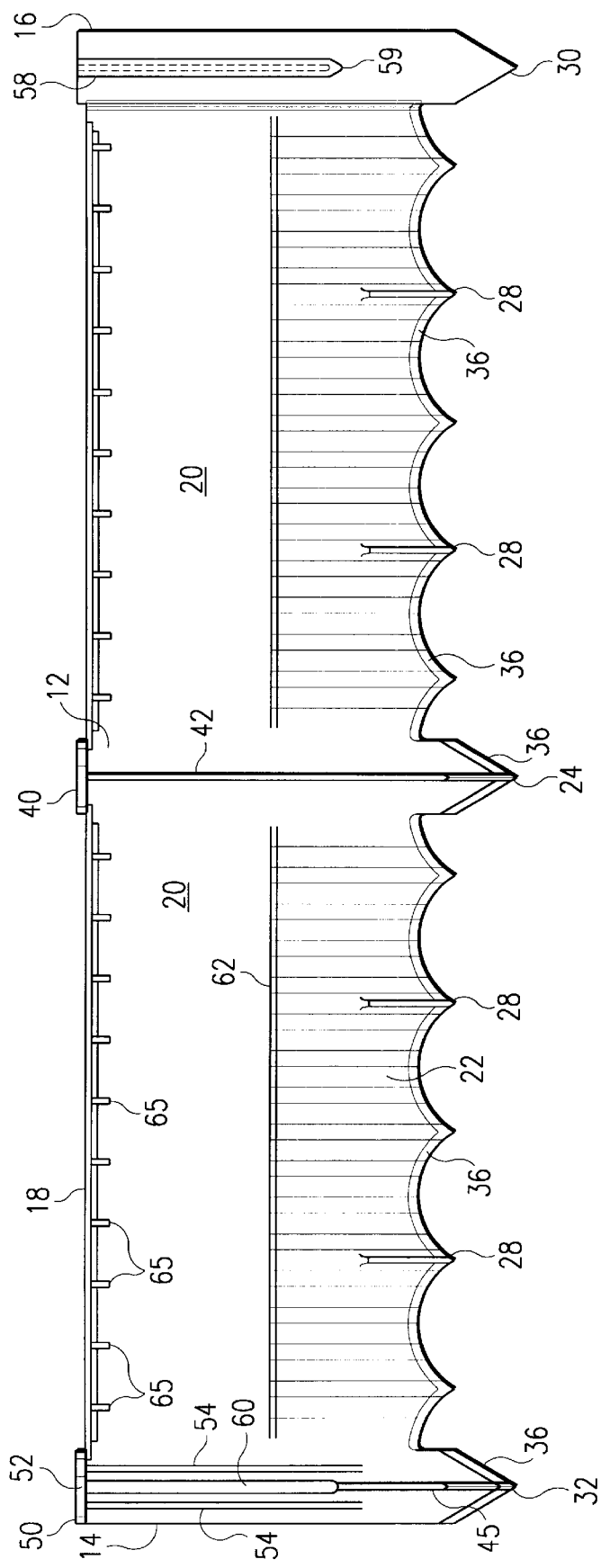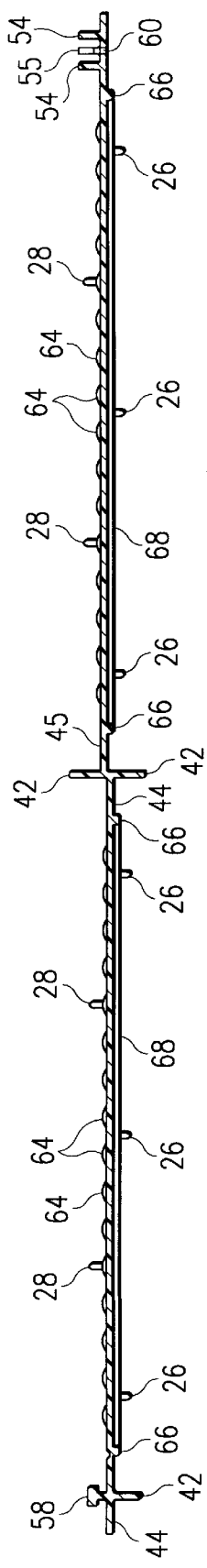

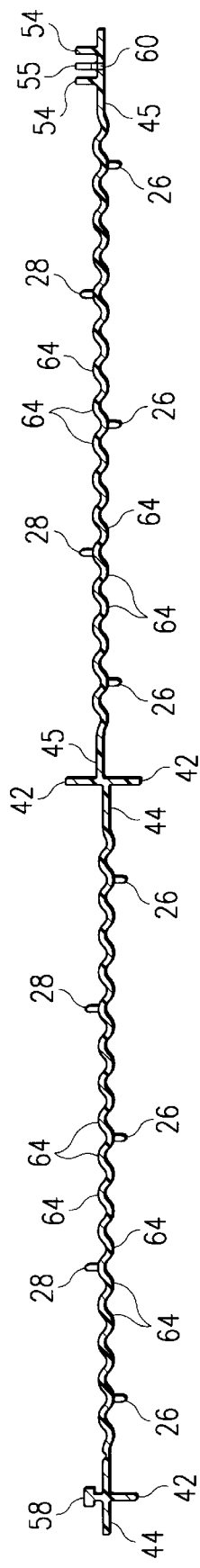
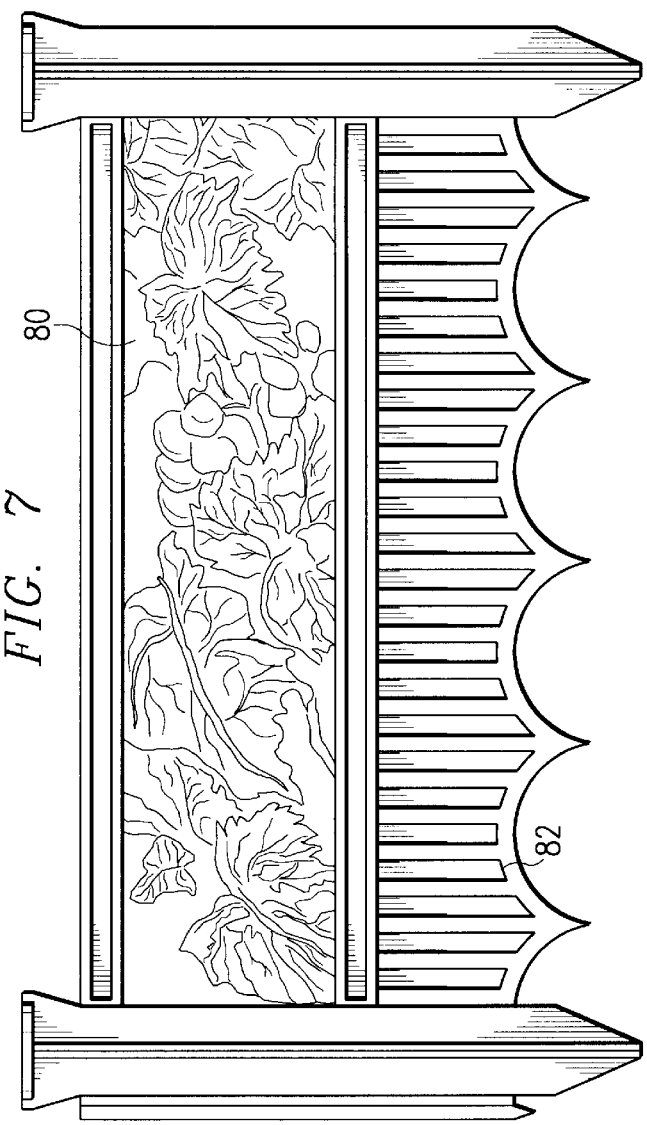
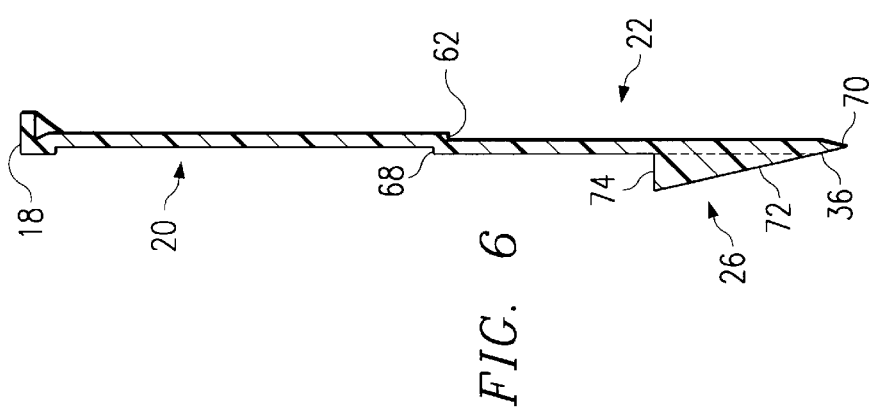
FIG. 5
FIG. 7
FIG. 6

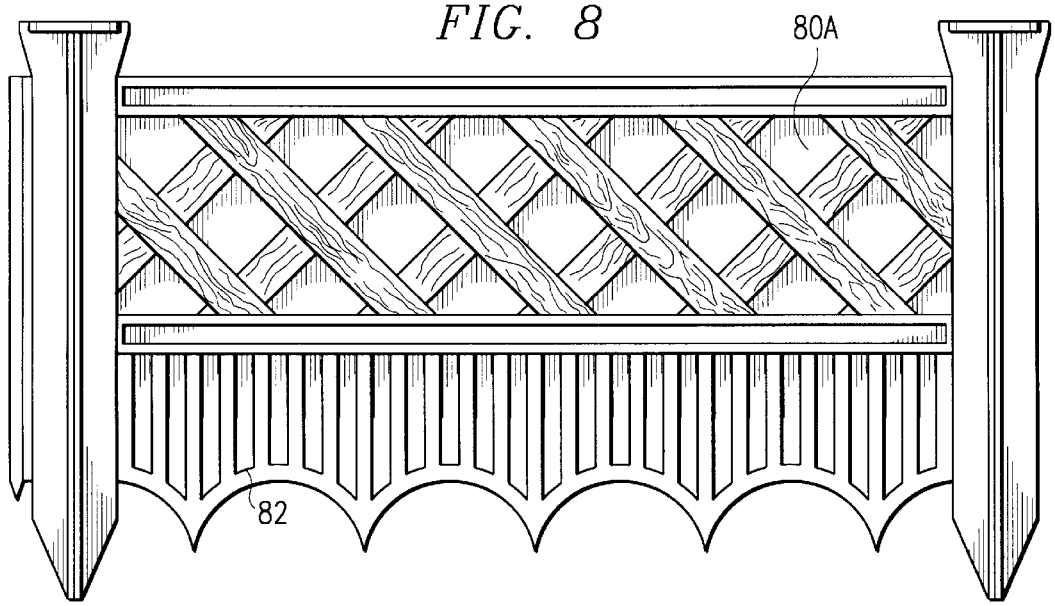
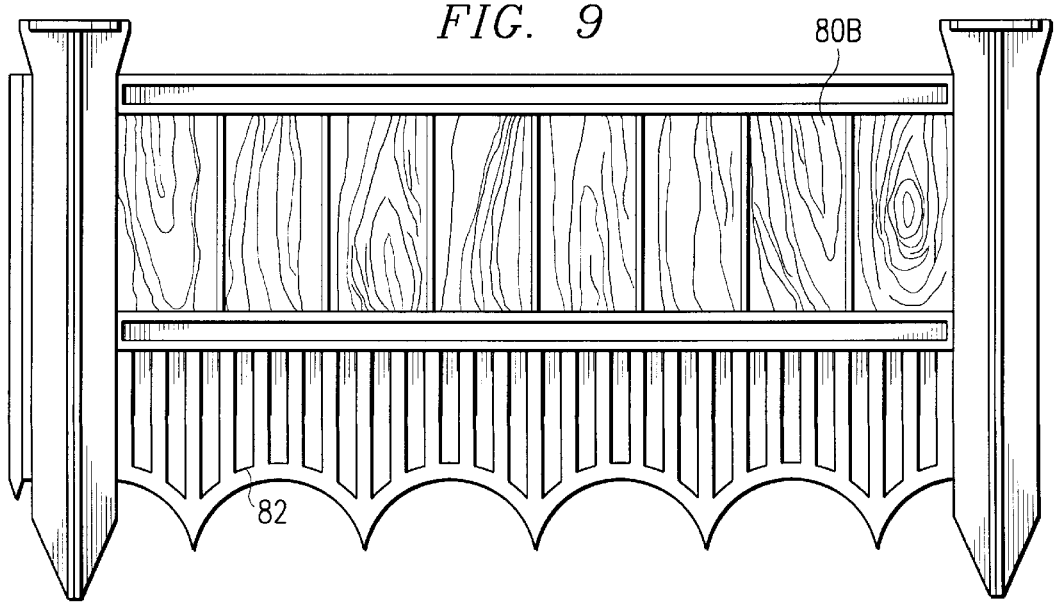

LAWN EDGING WITH INTEGRAL STAKES

BACKGROUND

In yards and gardens at home and in other locations, a common problem is the encroachment of grass and weeds into undesired areas such as around the base of young trees, in a landscaped section, or even onto sidewalks and paths. A common approach is to provide a lawn edging to create a barrier restricting the direct growth into such protected areas. Traditional forms of lawn edging have included basic planar sheets or strips of plastic, tin, or other materials held in place by stakes driven into the ground. These stakes sometimes are provided with hooks to restrain the movement of the sheets and sometimes are passed through an eye or other opening to restrict sheet movement. In either event the edging provides a physical barrier starting at ground level and rising up to the top of the barrier strip.

Another alternative is to use a heavier and bulkier barrier to restrict incursion into the protected areas. The most traditional example would be the use of bricks resting on the ground as a border. Other examples would include the Landscape Edging of U.S. Pat. No. 4,747,231 of LeMay et al which consists of a series of log sections strung together on a strip or the Decorative Lawn Edging of U.S. Design Pat. No. 361,853 which provides the appearance of a set of trimmed two by four tops strung together along a strip. The Plastic Landscape Edging Unit of U.S. Design Pat. No. 276,494 to Novak also provides log shapes strung on a strip (or integrally molded with a strip), but also apparently provides apertures for receiving some type of stake already in the ground. In any event, these examples also provide some protection against incursion while additionally creating a decorative effect. They are not well suited for hammering a significant distance into the ground, however, nor do they provide the stability of a deeper connection with the ground.

The prior art also contains fence units such as U.S. Design Pat. No. 359,130 to Northrop et al and U.S. Pat. No. 3,701,477 to Matt et al (which is primarily intended as a sprinkler system) which may also be placed to serve as a border around protective areas. While these devices consist of a sequence of posts with a set of cross beams, they are not as well suited for actually preventing the incursion of grass or weeds and form more of a visual border than an actual barrier. The sprinkler concealing fence of Matt et al does not even have contact at ground level by its cross beam, leaving the space between the posts completely open. The fence unit of Northrop does not appear to be intended to provide complete protection against incursion. The fence units also have the problem that although they are designed to be have at least the "posts" inserted into the ground they are not well configured for hammering to accomplish this goal. In Matt et al the posts actually come to a point, while on the Northrop fence unit the top surface of the posts provides a rather thin rectangle.

Finally, U.S. Pat. No. 2,877,600 to Slate for fence construction and U.S. Pat. No. 5,456,045 to Bradley et al for lawn edging strip provide solid walls which are inserted to some depth within the ground to act as borders. Slate still does not provide much in the way of a surface for hammering and also provides extensions intended to rest on the surface of the ground to prevent the unit from being inserted too far into the ground. Bradley et al appears to be the most flexible, providing a top surface which although scalloped provides a broad surface for hammering the strip into the ground. Bradley also provides tapered ribs and a tapered bottom edge to facilitate insertion. Bradley loses, however, the advantages of deeper penetration providing more stability with less material provided by stakes which go to a greater depth than the main body of the strip, as well as the more traditional look provided by such stakes.

Further, a problem also exists when the ground freezes and contracts resulting in "frost-heave" by which a strip inserted into the ground may be forced out of the ground. Neither Bradley nor Slate provide any mechanism for retarding the motion of the strip back out of the ground in such a circumstance. Further Bradley's full body taper might actually facilitate such undesired motion in response to ground contraction, while Slate actually calls for extensions on top of the surface to prevent the strip from going too deep. Additionally, neither Slate nor Bradley provide an uninterrupted surface for providing additional decoration to enhance the appearance of the strip. In this manner they carry many of the same weaknesses of the original planar strips which provided an unattractive functional means to discourage incursion into protected areas, but did not have the flexibility in appearance to create an appealing visual border as well. Bradley in fact has tapered support strips running from bottom to top throughout its length, with only its scalloped top surface generating any visual appeal for the border outside of the immediate function of discouraging incursion.

SUMMARY OF THE INVENTION

The preferred embodiment of the present invention provides a combination of features creating several advantages. The present invention provides an edging strip with integrally molded stakes. The strip of the invention is a single, integrally molded piece, greatly simplifying construction, packaging, shipping, and assembly by the end user. Strips may be sold in groups or individually, with the requisite number available to be interlocked together to border the desired area. The manufacturer need not worry about packing and shipping and the customer need not worry about locating and keeping track of separate stakes or other loose parts for each strip. Each strip will present an independent and usable item containing within the one piece the components necessary to position and attach the strip within the ground and to link it with other strips as desired.

The integral stakes each also have broad top surfaces which provide a hammering surface for inserting the strip within the ground. The preferred embodiment of the strip includes support ribs with catches or ledges which act to resist the effects of frost heave and reduce unintentional removal of the strip from the ground. The support ribs do not extend to the top of the strip, leaving a blank panel section which may be used during the molding process to form various possible decorative sections to improve the visual appeal of the strip. The strip also provides a barrier from relatively deep within the ground all the way up to the top surface for restricting the incursion of grass or weeds into the protected area. Finally, the strip uses interlocking semi-stakes at its end points to connect with other strips, providing a full hammering surface when interlocked and providing anchoring points at the points of connection.

BRIEF DESCRIPTION OF THE DRAWINGS

FIG. 1 is a front view of the edging strip;

FIG. 2 is a top view of the edging strip;

FIG. 3 is a back view of the edging strip;

FIG. 4 is a cut-away view of the edging strip along line A—A of FIG. 1 looking downward.

FIG. 5 is a cut-away view of the edging strip along line B—B of FIG. 1 looking downward.

FIG. 6 is a cut-away view of the edging strip along line C—C of FIG. 1 looking sideways towards the male semi-stake.

FIG. 7 is a front view of one alternative embodiment with a decorative panel incorporating a leaf motif molded in place.

FIG. 8 is a front view of one alternative embodiment with a decorative panel incorporating a lattice motif molded in place.

FIG. 9 is a front view of one alternative embodiment with a decorative panel incorporating a wood panel motif molded in place.

DETAILED DESCRIPTION

In order to illustrate the preferred embodiment of the system and method, the following is a detailed description of lawn edging strip 10 as shown by FIGS. 1–6. Referring to FIG. 1, the preferred embodiment of the disclosed invention constitutes a single injection molded piece 10 as discussed in the summary of the invention and referred to hereinafter as a lawn edging strip 10 or simply strip 10. The main components of strip 10 are full stake 12, female semi-stake 14, male semi-stake 16, top surface 18, bottom edge 19 or lower edge 19, and panel section 20. Full stake 12 is located approximately in the center of strip 10 and is oriented perpendicularly to top surface 18 and generally perpendicular to bottom edge 19. On one end of strip 10, the right end from the front in the disclosed embodiment, is a female semi-stake 14. The opposite end of strip 10 has male semi-stake 16. Both of these semi-stakes are also oriented perpendicularly to top surface 18 and bottom edge 19. All three stakes extend above top surface 18 and below bottom edge 19 of strip 10. All three stakes are integrally molded with strip 10.

The main portion of the body of strip 10 may be roughly divided into quadrants. Full stake 12 acts to divide the main body of strip 10 into a right half and a left half. In the preferred embodiment, these halves are identical and are mirror images of each other over full stake 12. Each of these mirror halves may further be recognized to have two sections, a panel section 20 on the upper portion of the main body of strip 10 and a textured section 22 on the lower portion of the main body of strip 10. These portions may alternatively be referred to as the grounded portion 22 and the exposed portion 20, for the reason that when the strip is in place inserted within the ground most of textured portion 22 will be within the ground while all of panel portion 20 will be exposed.

Insertion into the ground of strip 10 is primarily accomplished by hammering each of the stakes, full stake 12, and semi-stakes 14 and 16 into the ground. Each of these stakes has a top and bottom end. Bottom end 24 of full stake 12 has multiple rib sections tapering down to a central point. Male semi-stake 16 has bottom end 30 also containing several sections tapering to a point, which from the front view appear identical to bottom end 24 of full stake 12. Female semi-stake 14 viewed from the front view of FIG. 1 has bottom end 32 which also tapers down to a stake point. In an alternative embodiment, the female semi-stake may only taper to a truncated section rather than all the way down to a point. As will be seen later, the configurations of end 32 of female semi-stake 14 and end 30 of male semi-stake 16 are configured to cooperate together to form an equivalent support to that of full stake 12 bottom end 24 when such semi-stakes are mated to interlock multiple strips 10.

Lower portion 22 is further defined by a series of support ribs 26 and 28. Ribs 26 run up the front side of lower portion 22 of strip 10 from a point at or below the bottom edge of lower portion 22, stopping before reaching panel section 20. In the disclosed embodiment, the bottom of support ribs 26 coincide with the bottom edge of the main body of strip 10. Support ribs 28 run up the back side of lower portion 22, again from at or below the bottom edge of the main body of strip 10 stopping at a point below the panel section 20 of strip 10. In the preferred embodiment, there is no significant difference between front support ribs 26 and rear support ribs or back support ribs 28 other than the side of the strip on which they are located. Bottom edge 19 of the main body of strip 10 presents a series of scallops 34 along its length coming to points in conjunction with the tips of the support ribs 26 and 28. Bottom edge 19 further has a chisel-like taper 36 running along its length which aids in insertion of strip 10 into the ground. The same chisel-like taper 36 may also be observed on the bottom ends of the front side of full stake 12 and semi-stake 16.

Finally with respect to FIG. 1, panel section 20 is demarcated by edges 68 between panel section 20 and textured section 22 and edges 66 between panel section 20 and the full and semi-stakes 12, 14, and 16, respectively. The upper boundary of panel section 20 ends at the beginning of top surface 18 of strip 10.

Panel section 20 provides a blank surface which will remain exposed when strip 10 is inserted into the ground. To enhance the visual appearance and effect as a visual border accomplished by strip 10, various panels may be molded into this section. As a matter of production, a basic mold may be used to make all of the possible strips 10 with various looks created by changing simple inserts which would change only the appearance of the panel section 20. In this way a more diverse product line may be created while maintaining the simplicity of basically a single mold.

FIG. 2 provides a view from the top looking down on strip 10. Top surface 18 is a narrow rectangular surface traveling between full stake 12 and semi-stakes 14 and 16, respectively. Front support ribs 26 and back support ribs 28 extend further out from the body of strip 10 than top surface 18 but do not provide the breadth needed for a well-configured hammering surface.

The top end of full stake 12 provides a surface for hammering, or hammering surface 40. This surface, circular in the disclosed embodiment, provides sufficient space and support to conveniently hammer strip 10 into the ground with less danger of mis-hitting the hammering point and thereby accidentally bending or breaking a portion of strip 10. Hammering surface 40 is supported by lateral ribs 42 which extend perpendicularly away from the main body of strip 10 and by longitudinal ribs 44 and 45 which run along the length of the main body of strip 10. Longitudinal rib 45, and the half of the main body extending from it, is slightly offset from longitudinal rib 44 and the other half of the main body. This configuration simplifies the matter of creating a supported interlocking between a male and female semi-stake when multiple strips are put together. The back edge of rib 44 coincides with the front edge of rib 45. An imaginary line running along that conjunction for the length of strip 10 would represent the center line of strip 10. When a series of strips 10 are interconnected, because of the alternating sides, this center line could remain constant and uniform regardless of the number of strips connected. If disclosed offset were not present, then at each point of interlock, the center line would drop between one strip and the next requiring each strip 10 to be slightly angled if a straight line was to be maintained along the series of strips 10.

Hammering surface 40 extends laterally further than any portion of normal top surface 18 of strip 10 as well as the mean of top surface 18 and the median of top surface 18, both towards the front side of strip 10 and towards the back side of strip 10.

The top view provided by FIG. 2 also illustrates key features of each of the semi-stakes 14 and 16. Female semi-stake 14 has a top hammering surface 50. Hammering surface 50 extends laterally further towards the back than any of the normal top surface 18 of strip 10 (or the mean or median as well). Hammering surface 50 of the female semi-stake 14 is supported by two laterally extending ribs 54 and by two longitudinally extending ribs 45 which are in line with longitudinal rib 45 of full stake 12. Hammering surface 50 of female semi-stake 14 represents approximately one-half of the hammering surface provided by full stake 12. In the disclosed embodiment, hammering surface 50 is a semi-circle which would provide half the area of the full circle hammering surface 40. Hammering surface 50 is effectively the portion of hammering surface 40 in back of the center line of strip 10 discussed earlier. Female semi-stake 14 also incorporates a key hole notch 52 which in the disclosed embodiment may also be described as T-notch 52. This notch 52 provides for insertion and interlock with an extension 58 of a male semi-stake 16 of a separate strip 10. The notch 52 may also be referred to as recess 52, which can contain within the recess the extension of a male semi-stake 16.

Male semi-stake 16 also provides a semi-circular hammering surface 56. Like female semi-stake 14 and its hammering surface 50, hammering surface 56 represents approximately one-half of the area provided by hammering surface 40 of full stake 12. By comparison, hammering surface 56 is a semi-circle extending from the center line of strip 10 towards the front side of strip 10. Hammering surface 56 is supported by two longitudinal sections 44 and by a lateral rib 42. Again, longitudinal supports 44 are in line with longitudinal support 44 of full stake 12. Male semi-stake 16 further has a lateral extension 58. In the disclosed embodiment, lateral extension 58 has a T-shaped cross-section. This lateral extension 58 is perpendicular to top surface 18 running lengthwise down male semi-stake 16 towards the bottom end 30 but not reaching the bottom end 30. When one male semi-stake 16 is interlocked with a female semi-stake 14, the hammering surfaces 56 and 50 respectively combine to provide a single joined hammering surface at least roughly equivalent to hammering surface 40 of full stake 12.

Finally, next to male semi-stake 16 in one embodiment of the invention there may be a living hinge 38. A living hinge is a thinned section of the main body of strip 10 including a thin end of top surface 18 which creates a weaker point allowing bending of strip 10. This bending provides the ability of a series of strip 10 to be more easily manipulated to fit the shape of the border which is desired to prevent incursion into a protected area. Although living hinges such as living hinge 38 could be located at any point along strip 10, preferably such hinges would be located at or near conjunction of the main body of strip 10 with full stake 12 or semi-stakes 14 and/or 16, and most preferably at the edge of one of the semi-stakes 14 or 16 which would be at a point closest to the interlocking point between one strip 10 and another strip 10.

FIG. 3 is a view of the back side of the preferred embodiment of strip 10. Back support ribs 28 are clearly seen within grounded section 22. Hammering surface 40 of full stake 12 and hammering surface 50 of female semi-stake 14 are seen to extend towards the back side of strip 10 (from the FIG. 1 front view, hammering surface 40 of full stake 12 and hammering surface 56 of male semi-stake 16 are seen to extend towards the front side of strip 10). Edge 62 is present at the dividing line between grounded section 22 and panel section 20. Chisel tapers 36 are present along bottom edge 19 of the main body of strip 10 as well as on the back side of bottom end 24 of full stake 12 and the back side of bottom end 32 of female semi-stake 14. Chisel tapers 36 are not present at the back side of bottom end 30 of male semi-stake 16, this parallels their absence on the front side of bottom end 32 of female semi-stake 14, as may be seen in FIG. 1. Again, these chisel tapers 36 serve to facilitate the insertion of strip 10 into the ground. Notch 52 of female semi-stake 14 maybe seen to extend downwards as a continuing slot or recess 60. Slot 60 does not extend all the way to the bottom end 32 of female semi-stake 14 but rather stops at a point below the end of panel section 20 and towards the middle of grounded section 22. In the preferred embodiment, a single slot support rib 55 extends from the base of slot 60 to bottom end 32 of female semi-stake 14. Lateral supporting ribs 54 of female semi-stake 14 extend to a point below the bottom of slot 60. In an alternative embodiment, lateral supporting ribs 54 may extend all the way from hammering surface 50 to bottom end 32 of female semi-stake 14 while slot support rib 55 is not present.

Extension 58 of male semi-stake 16 also extends from the top of male semi-stake 16 towards the bottom end 30 without reaching bottom end 30. From this back view, the top of the T-section is observed with hidden lines showing the base of the T of extension 58. The lower end 59 of extension 58 tapers to a rounded point, with the top of the T-profile extending a small amount past the base of the T-profile.

To successfully interlock multiple strips 10, a strip having a male semi-stake 16 is inserted downwards with male semi-stake 16 mating with female semi-stake 14. The rounded tapered end 59 of extension 58 fits into notch 52 of female semi-stake 14. Strip 10 with the male semi-stake then continues to be pressed downward and extension 58 slowly slides into slot 60 until end 59 extends slightly past the bottom of slot 60 and the base of the T-profile rests directly against the bottom of slot 60 preventing further movement downwards of the strip 10 whose male semi-stake 16 is the active interlocking portion. The top of the T-profile of extension 58 is then contained within the notch 52 and is bounded by lateral support ribs 54 and the edges of longitudinal support ribs 45. Only the base of the T-profile is narrow enough to fit through slot 60. One skilled in the art will recognize that other key and key hole shapes may be used besides a simple T-profile configuration, although for the current invention the T shape is the preferred embodiment. Having interlocked the male semi-stake 16 of one strip 10 with the female semi-stake 14 of a second strip 10, the female semi-stake of the first strip 10 would still be available for the insertion of a male semi-stake from yet another strip 10. Further, the male semi-stake of the second strip 10 would still be available, however, having already been inserted into the ground it may be difficult to position another strip 10 below it to accomplish the insertion. Alternatively, the series of strips 10 may be interlocked above ground and then positioned on top of the ground and hammered in as a unit rather than accomplishing the interlock and insertion into the ground in the same step.

FIG. 3 also shows a series of short support ribs 65 supporting top surface 18. Short support ribs 65 do extend somewhat down onto the back side of panel section 20, as in the preferred embodiment the back side of panel section 20 is not intended to receive the decorative molding which may be used on the front side of panel section 20.

FIG. 4 is a cut away view of FIG. 1 along section A—A. This section is taken out of the middle of panel section 20 looking down. This view provides the opportunity to see the edges 66 and 68 which border panel section 20. Also shown are corrugations 64 from the textured section 22. These corrugations 64 of the preferred embodiment may be better observed in FIG. 5.

FIG. 5 is a cut away view along section B—B of FIG. 1. This view is taken through the textured section or grounded section 22 looking downward. Extension 58 is clearly seen as is slot 60 and lateral supports 54 defining the recess into which extension 58 is inserted and contained. In the disclosed embodiment, grounded section 22 is in fact corrugated throughout the main body of strip 10. These corrugations 64 are in both directions and extend the length of the main body between the full stake 12 and each of the semi-stakes 14 and 16, with the only straight sections being the various longitudinal support ribs 44 and 45 near the stakes themselves. Corrugations 64 provide additional strength to strip 10. This benefit is reflected in the ability to use a thinner wall section (and hence less material), fewer ribs 26 & 28, and also support ribs 26 & 28 which do not need to extend completely from bottom to top. Each of these benefits is individually possible due to the added strength brought by the corrugations 64. In the preferred embodiment corrugations 64 take the form of a wave with a relatively constant radius of curvature. In alternative embodiments corrugations 64 could take on other shapes such as a more linearized wave or a series of half-waves connected with flattened sections not unlike typical cardboard corrugations.

FIG. 6 provides another cut away view this time along section C–C of FIG. 1 looking sideways through strip 10. This section was taken through one of the front side support ribs 26. Top surface 18 and edge 68 and division 62 border the upper and lower part of panel section 20, respectively, are observed from a different angle in this view. Of most importance in the view is the configuration of support rib 26. Support rib 26 tapers to a point 70 on bottom edge 19 of strip 10. Moving upwards from the bottom edge, support rib 26 first goes through the chisel taper through tapered stretch 36 then a gentler taper 72 increasing in distance from the main body of strip 10 as it heads towards top surface 18. At a point somewhere near the middle of grounded section 22, support rib 26 cuts off sharply in a ledge 74. This ledge 74 acts as a catch which is useful in preventing problems associated with frost heave. When strip 10 is inserted into the ground, the gentler taper 72 allows the strip to continue to be inserted slowly expanding out the space in the ground until ledge 74 goes beneath ground level. The tapered profile allows for relative ease in this insertion process. However, once ledge 74 is below ground level, the ground will have a tendency to, as a collective whole, elastically respond and fill in behind ledge 74. This means that there will be some resistance in efforts to pull strip 10 back out of the ground. This resistance provided by ground behind and on top of ledge 74 will retard or restrict the effects of frost heave where contraction by the ground may potentially force strip 10 back on to the surface. Although ledge or catch 74 makes it more difficult for strip 10 to be removed, concerted effort may still affect its removal, but the retarding effect helps resist such problems in the less focused efforts of a frost heave situation. Those skilled in the art will recognize that other forms of catches may be used to achieve the same effect. For example, instead of having a filled in ledge 74, support rib 26 would have an actual recess section behind the outer edge of the taper 72 creating almost a hook-like appearance. This, however, is not the preferred embodiment and could cause problems by increasing the difficulty of intentional removal of strip 10 from the ground to a point where this becomes more of a concern than the possible problems of unintentional removal created by frost heave.

Finally, FIGS. 7, 8 and 9 represent possible alternatives illustrating the potentials for various decorative moldings in panel section 20. In FIG. 7, molded section 80 represents a pattern of leaves. In FIG. 8 molded section 80A is a lattice work. In FIG. 9 molded section 80B simulates wood paneling. The strips illustrated in these three alternative embodiments could each have been made from the same basic mold with only the simple matter of changing out one insert in the portion of the mold corresponding to panel section 20 to create each of these three alternative embodiments. One may also observe that instead of the corrugations 64 of the preferred embodiment, each of these Figures discloses a different pattern for the grounded section 22 consisting of a series of flattened sections 82 in combination with half-waves as discussed previously as an alternative embodiment of corrugations 64. While this change creates a different look, it does not have a significant effect on the function of strip 10 as a whole and the strength advantages provided by corrugations 64 (and the flexibility to reduce other elements which provide strength such as thickness of walls, and number and length of ribs) are still present.

As a non-preferred alternative, strips could be molded with the blank panel section 20 shown in FIGS. 1–6, combined with a means to releasably attach separate panels provided to the customer. An example of such a means would be circular depressions in panel section 20 and corresponding cylindrical extensions from the proposed separate decorative panels which could snap into place into the circular depressions. In this way a customer could buy the panels separately or choose and change among different panels. However, this would defeat an advantage of the invention in that only a single molded piece for each strip must be packaged, shipped, and kept track of. Nevertheless, there still would not be the problem of loose stakes or other minor parts necessary for the non-visual functions of the edging strip.

The above description relates to the preferred mode of our invention. Variations and additional features and functions within the skill of the art are intended to be covered.

I claim:

1. A poundable lawn edging device comprising:
   a strip having a top surface, a bottom edge, and two ends;
   a full stake integral with said strip located between said ends of said strip and oriented perpendicularly to said bottom edge of said strip;
   said full stake having a top end and a bottom end;
   wherein said top end of said full stake is configured to provide a surface for hammering which extends horizontally in at least one direction along said top surface of said strip; and
   wherein said strip further comprises an upper and a lower portion wherein only said lower portion comprises vertical corrugations along its length between said full stake and said ends.

2. The poundable lawn edging device of claim 1 further comprising:
   two opposing semi-stakes integral with said strip, one positioned at each of said two ends of said strip and oriented perpendicularly to said bottom edge of said strip; wherein either of said opposing semi-stakes may be mated with an opposing semi-stake at the end of a separate strip to form a full stake connecting said strip with said separate strip.

3. The poundable lawn edging device of claim 2 wherein:

each of said semi-stakes has a top end providing a hammering surface representing approximately one-half of said hammering surface of said full stake.

4. The poundable lawn edging device of claim 3 wherein:

said top surface of said strip has a centerline along the length of the strip;

said hammering surface of one of said semi-stakes is disposed mostly on one side of said centerline; and said hammering surface of the other of said semi-stakes is disposed mostly on the opposite side of said centerline.

5. The poundable lawn edging device of claim 4 wherein:

said strip essentially consists of two sections, where one of said sections extends from said one of said semi-stakes to said full stake, and the other of said sections extends from said other of said semi-stakes to said full stake; and wherein at least the majority of each of said sections is disposed on the same side of said centerline as said hammering surface of said semi-stake attached to said section.

6. The poundable lawn edging device of claim 2, wherein:

said strip has a front side having a plurality of rib supports on the lower portion of said front side running from at or below the bottom edge towards said top surface and stopping short of said top surface defining two flat sections of said front side between the top of said plurality of supports and said top surface of said strip, one of said flat sections between said full stake and one of said semi-stakes and the other of said flat sections between said full stake and the other of said semi-stakes;

each of said flat sections configured to be molded by a decorative insert in the mold during the molding process.

7. The poundable lawn edging device of claim 2, wherein:

said strip has a front side having a plurality of rib supports on the lower portion of said front side running from at or below the bottom edge towards said top surface and stopping short of said top surface defining two flat sections of said front side between the top of said plurality of supports and said top surface of said strip, one of said flat sections between said full stake and one of said semi-stakes and the other of said flat sections between said full stake and the other of said semi-stakes;

each of said flat sections configured to receive and releasably hold a decorative insert against said front side of said strip.

8. The poundable lawn edging device of claim 1 further comprising:

a male semi-stake integral with said strip, positioned at one of said two ends of said strip and oriented perpendicularly to said bottom edge of said strip, said male semi-stake having a top end providing a hammering surface approximately one-half of the area of said hammering surface of said full stake; and a female semi-stake integral with said strip, positioned at one of said two ends of said strip and oriented perpendicularly to said bottom edge of said strip, said female semi-stake having a top end providing a hammering surface approximately one-half of the area of said hammering surface of said full stake.

9. The poundable lawn edging device of claim 8 wherein:

said male semi-stake provides an extension along a portion of said male semi-stake positioned perpendicularly to said bottom edge of said strip;

said female semi-stake provides a pair of walls forming a recess along a portion of said female semi-stake positioned perpendicularly to said bottom edge of said strip configured to receive an extension of a male semi-stake of another strip in interlocking connection.

10. The poundable lawn edging device of claim 9 wherein:

said interlocking connection is formed by vertically downward inserting one of said semi-stake portions into an opposing semi-stake portion on said another strip, said interlocking connection having a top end providing a hammering surface having approximately the same area as said hammering surface of said full stake.

11. The poundable lawn edging device of claim 10 wherein:

said male semi-stake portion is vertically downward inserted into a female semi-stake portion on said another strip to form said interlocking connection.

12. The poundable lawn edging device of claim 1 further comprising:

a plurality of support ribs running up a side of said strip from at or below said bottom edge towards said top surface;

at least one of said support ribs having a catch positioned to resist removal from the ground after insertion of said strip into the ground past said catch.

13. The poundable lawn edging device of claim 12, wherein:

said catch comprises a shelf in said rib perpendicular to said side of said strip.

14. The poundable lawn edging device of claim 1, wherein:

said strip has a front side having a plurality of rib supports on the lower portion of said front side running from at or below the bottom edge towards said top surface and stopping short of said top surface defining a flat section of said front side between the top of said plurality of supports and said top surface of said strip;

said flat section configured to receive a decorative insert during the molding process.

15. The poundable lawn edging device of claim 1, wherein:

said strip has a front side having a plurality of rib supports on the lower portion of said front side running from at or below the bottom edge towards said top surface and stopping short of said top surface defining a flat section of said front side between the top of said plurality of supports and said top surface of said strip;

said flat sections configured to receive and releasably hold a decorative insert against said front side of said strip.

16. A poundable lawn edging device comprising:

a strip having a top surface, a bottom edge, front and rear sides, and two ends;

a plurality of support ribs extending vertically up said front side of said strip from at or below said bottom edge towards said top surface;

at least one of said support ribs having a catch positioned to resist removal from the ground after insertion of said strip into the ground past said catch;

at least one additional support rib extending vertically up said rear side of said strip from at or below said bottom edge towards said top surface at a point between two of said plurality of support ribs;

said at least one additional support rib having a catch positioned to resist removal from the ground after insertion of said strip into the ground past said catch.

17. The poundable lawn edging device of claim 16, wherein:

said catch comprises a shelf in said rib perpendicular to said side of said strip.

18. The poundable lawn edging of claim 16, wherein:

said plurality of support ribs extending vertically up said front side stop short of said top surface to define a flat section on said front side between the top of said plurality of support ribs and said top surface of said strip; and wherein said flat section is configured to receive a decorative insert during the molding process.

19. A poundable lawn edging device comprising:

a strip having a top surface, a bottom edge, and two ends;

a full stake integral with said strip located between said ends of said strip and oriented perpendicularly to said bottom edge of said strip;

said full stake having a top end and a bottom end;

said top end of said full stake configured to provide a surface for hammering which extends horizontally in at least one direction along said top surface of said strip;

a male semi-stake integral with said strip, positioned at one of said two ends of said strip and oriented perpendicularly to said bottom edge of said strip, said male semi-stake having a top end providing a hammering surface approximately one-half of the area of said hammering surface of said fill stake; and a female semi-stake integral with said strip, positioned at one end of said two ends of said strip and oriented perpendicularly to said bottom edge of said strip, said female semi-stake having a top end providing a hammering surface approximately one-half of the area of said hammering surface of said full stake.

20. The poundable lawn edging device of claim 19, wherein:

said male semi-stake provides an extension along a portion of said male semi-stake positioned perpendicularly to said bottom edge of said strip; and said female semi-stake provides a pair of walls forming a recess along a portion of said female semi-stake positioned perpendicularly to said bottom edge of said strip configured to receive an extension of a male semi-stake of another strip in interlocking connection.

21. The poundable lawn edging device of claim 20, wherein said interlocking connection is formed by vertically downward inserting one of said semi-stake portions into an opposing semi-stake portion on said another strip, said interlocking connection having a top end providing a hammering surface having approximately the same area as said hammering surface of said full stake.

22. The poundable lawn edging device of claim 21, wherein said male semi-stake portion is vertically downward inserted into a female semi-stake portion on said another stake to form said interlocking connection.

23. A poundable lawn edging device comprising:

a strip having a top surface, a bottom edge, and two ends;

a full stake integral with said strip located between said ends of said strip and oriented perpendicularly to said bottom edge of said strip;

said full stake having a top end and a bottom end;

said top end of said full stake configured to provide a surface for hammering which extends horizontally in at least one direction along said top surface of said strip;

a plurality of support ribs running up a side of said strip from at or below said bottom edge towards said top surface;

at least one of said support ribs having a catch positioned to resist removal from the ground after insertion of said strip into the ground past said catch.

24. The poundable lawn edging device of claim 23, wherein:

said catch comprises a shelf in said rib perpendicular to said side of said strip.

25. A poundable lawn edging device comprising:

a strip having a top surface, a bottom edge, and two ends;

a full stake integral with said strip located between said ends of said strip and oriented perpendicularly to said bottom edge of said strip;

said full stake having a top end and a bottom end;

said top end of said full stake configured to provide a surface for hammering which extends horizontally in at least one direction along said top surface of said strip;

wherein said strip has a front side having a plurality of rib supports on the lower portion of said front side running from at or below the bottom edge towards said top surface and stopping short of said top surface defining a flat section of said front side between the top of said plurality of supports and said top surface of said strip;

wherein said flat section is configured to receive a decorative insert.

26. The poundable lawn edging of claim 25, wherein said flat section is configured to receive the decorative insert during the molding process.

27. The poundable lawn edging of claim 25, wherein said flat section is configured to receive and releasably hold the decorative insert against said front side of said strip.

* * * * *